(12) United States Patent
Chaudhry et al.

(10) Patent No.: US 7,191,292 B2
(45) Date of Patent: Mar. 13, 2007

(54) LOGGING OF LEVEL-TWO CACHE TRANSACTIONS INTO BANKS OF THE LEVEL-TWO CACHE FOR SYSTEM ROLLBACK

(75) Inventors: Shailender Chaudhry, San Francisco, CA (US); Quinn A. Jacobson, Sunnyvale, CA (US); Ashley Saulsbury, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 25 days.

(21) Appl. No.: 11/144,097

(22) Filed: Jun. 2, 2005
(Under 37 CFR 1.47)

(65) Prior Publication Data

US 2006/0136672 A1 Jun. 22, 2006

Related U.S. Application Data

(60) Provisional application No. 60/576,959, filed on Jun. 4, 2004, provisional application No. 60/576,958, filed on Jun. 4, 2004.

(51) Int. Cl.
*G06F 12/00* (2006.01)

(52) U.S. Cl. .......................................... 711/133; 711/5

(58) Field of Classification Search ................ 711/5, 711/119, 122, 133, 134, 159
See application file for complete search history.

(56) References Cited

U.S. PATENT DOCUMENTS

| | | | | |
|---|---|---|---|---|
| 6,529,971 | B1* | 3/2003 | Thiesfeld ...................... 710/53 |
| 6,812,929 | B2* | 11/2004 | Lavelle et al. .............. 345/535 |
| 6,836,272 | B2* | 12/2004 | Leung et al. ................ 345/540 |
| 7,027,064 | B2* | 4/2006 | Lavelle et al. .............. 345/557 |
| 2003/0174137 | A1* | 9/2003 | Leung et al. ................ 345/531 |

* cited by examiner

*Primary Examiner*—Brian R. Peugh
(74) *Attorney, Agent, or Firm*—Gunnison, McKay & Hodgson, L.L.P.; Forrest Gunnison (57) ABSTRACT

A plurality of processors on a chip is operated in lockstep. A crossbar switch on the chip couples and decouples the plurality of processors to a plurality of banks in a level-two (L2) cache. As data is stored in a first bank of the L2 cache, the old data at that location is passed through the crossbar switch to a second bank of the L2 cache that is functioning as a first-in-first-out memory (FIFO). Thus, new data is cached at a location in the first bank of the level-two cache, i.e., stored, and old data, from that location, is logged in the second bank of the level-two cache. The logged data in the second bank is used to restore the first bank to a known prior state when necessary.

24 Claims, 11 Drawing Sheets

LOGGING OF LEVEL-TWO CACHE TRANSACTIONS INTO BANKS OF THE LEVEL-TWO CACHE FOR SYSTEM ROLLBACK

RELATED APPLICATION

This application claims the benefit of:

U.S. Provisional Application No. 60/576,958 filed Jun. 4, 2004 entitled "Logging of Level-Two Cache Transactions Into Banks of the Level-Two Cache for System Rollback" and naming Shailender Chaudhry, Quinn A. Jacobson and Ashley Saulsbury as inventors, which is incorporated herein by reference in its entirety; and U.S. Provisional Application No. 60/576,959 filed Jun. 4, 2004 entitled "Logging of Level-Two Cache Transactions Into Banks of the Level-Two Cache Stores the Transactions for Diagnostic and Debug" and naming Shailender Chaudhry and Sudheendra Hangal as inventors, which is incorporated herein by reference in its entirety.

BACKGROUND OF THE INVENTION

1. Field of the Invention

The present invention relates generally to computer processors with level-two caches, and more particularly to methods and structures for using the level-two cache for rollback when a plurality of processor cores is running in lockstep.

2. Description of Related Art

Figure 1:
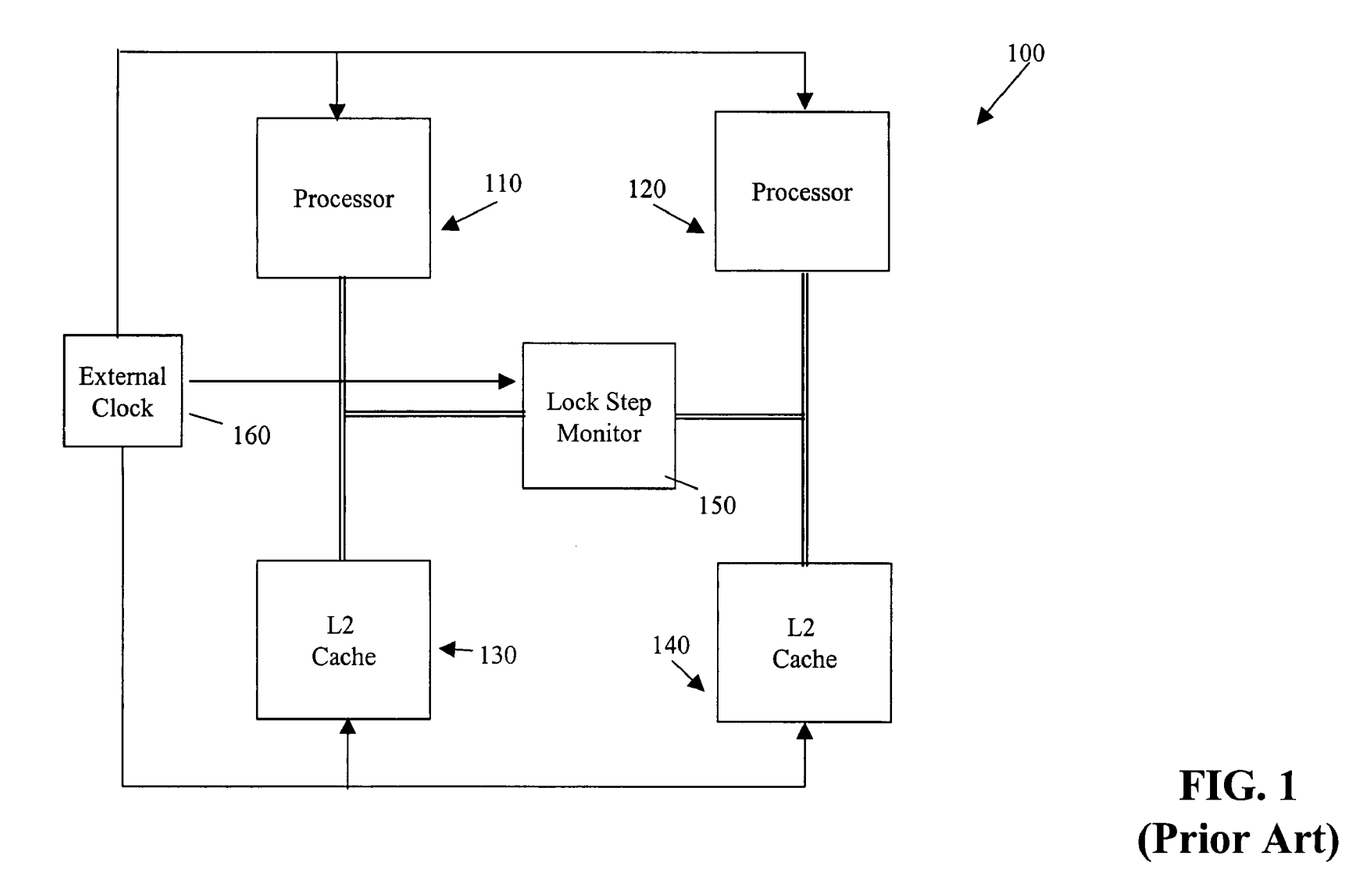
FIG. 1 is a block diagram of a prior art system that included processors operating in lockstep and that utilized external and internal clocks.

In a prior art system 100, high reliability was attempted by running processor 110 and processor 120 in lockstep. However, while conceptually this was straightforward, in practice it was difficult to implement.

System 100 had an external clock 160 and each processor 110, 120 had its own internal clock. To assure that processors 110, 120 were operating in lockstep, it was necessary to monitor stores to level-two caches 130, 140 for example by a lockstep monitor 150. For example, if different values were stored at a given point in time, processors 110, 120 were not in lockstep, or an error had occurred in one of both of processors 110, 120.

Assuring that the various clocks were synchronized and operating on the same cycle was a difficult problem. If the internal clocks diverted from the external clock, system 100 could not function reliably, because it was not possible to verify that the data was associated with the same processor clock cycle for example. New techniques are needed for verifying that processors operate in lockstep in a high reliability system.

SUMMARY OF THE INVENTION

In one embodiment of the present invention, a plurality of processors on a chip is operated in lockstep. A crossbar switch on the chip couples and decouples the plurality of processors to a plurality of banks in a level-two (L2) cache. As data is passed from each of the processors operating in lockstep to a bank of the L2 cache for storing, the data is compared to assure that the processors are operating in lockstep.

Assuming that a mis-compare is not detected, as data is stored in a first bank of the L2 cache, the old data at that location is passed through the crossbar switch to a second bank of the L2 cache that is functioning as a first-in-first-out memory (FIFO). Hence, in this embodiment, new data is cached at a location in the first bank of the level-two cache and old data, from that location, is logged in the second bank of the level-two cache.

The logging of the old data creates a history of the data in the first bank in the second bank. When a mis-compare does occur, the data in the second bank is used to restore the first bank to a known prior state, i.e., the data in the second bank is used to rollback the state of the first bank.

Since all these operations are performed on a single chip with an internal clock, the prior art problems associated with synchronizing internal and external clocks have been eliminated. Also, if a glitch in one or more of the processors operating in lockstep occurs, it is no longer necessary to restart an application. Rather, the execution is rolled back to a known point in time and automatically continued. The roll back is transparent to the application. Accordingly, not only is lockstep processing enhanced, but also overall system reliability is enhanced because the system appears to the application to be more stable than prior art systems that required a restart when a glitch occurred.

In one embodiment, the level-two cache is configured for using at least a first bank as a cache and for using at least a second bank as a FIFO by writing to a configure bank as FIFO register. The crossbar switch is configured to pass new data to the first bank and to pass the old data to the second bank by writing to a lockstep rollback configure register.

An address for the level-two cache includes an address tag and a plurality of bank select bits. To use some of the banks as a cache and other of the banks of the L2 cache as FIFOs, the address tag and at least one bank select bit are stored as a tag in the first bank of the level-two cache.

Thus, in one embodiment, a processor on a chip includes a plurality of processor cores; a level-two cache including a plurality of banks and a configure bank as FIFO register; and a crossbar switch connected to the plurality of processor cores and to the plurality of banks of the level-two cache. The crossbar switch includes a lockstep rollback configure register.

A system includes this processor coupled to a memory. In one embodiment, this system is a stand-alone computer system and in another embodiment, is a client-server system.

In still another embodiment, a structure includes means for using at least a first bank of a level-two cache as a cache for data. The level-two cache includes a plurality of banks. The structure also includes means for using at least a second bank of the plurality of banks of the level-two cache as a first-in-first-out memory structure for storing old data from the first bank.

The structure further includes means for configuring the level-two cache for the using at least the first bank as a cache and for the using at least the second bank as a FIFO. The means for configuring includes means for writing to a configure bank as FIFO register.

The structure also includes means for configuring a switch, coupling and decoupling a plurality of processor cores to the level-two cache, to pass new data to the first bank and to pass the old data to the second bank. The means for configuring the switch includes means for writing to a lockstep rollback configure register.

In one embodiment of the present invention, a plurality of processors on a chip is operated in a normal fashion in a debug and diagnostic mode of operation of the processor. A crossbar switch on the chip couples and decouples the plurality of processors to a plurality of banks in a level-two (L2) cache that is also on the chip.

As data is passed from each of the processors through the crossbar switch to the L2 cache, the data in cached in a first plurality of banks of the L2 cache. The commands associated with the data and information concerning the status of the data in the level-one cache are logged in another plurality of banks of the L2 cache.

The logging of the commands creates a history of commands associated with the data in the first plurality of banks. In addition, the information concerning the level-one (L1) cache provides information that was previously unavailable for debugging of the L1 and L2 caches.

If a cache error occurs, the information in the L2 cache is read out for diagnosis and debugging. The information on the level-one cache permits determining whether the error was in the level-one cache or in the level-two cache.

In one embodiment, the level-two cache is configured for using at least a first bank as a cache and for using at least a second bank as a FIFO by writing to a configure bank as FIFO register. The crossbar switch is configured to pass data to the first bank and to pass commands associated with the data to the second bank by writing to a debug configure register.

An address for the level-two cache includes an address tag and a plurality of bank select bits. To use some of the banks as a cache and other of the banks of the L2 cache as FIFOs, the address tag and at least one bank select bit are stored as a tag in the first bank of the level-two cache.

Thus, in one embodiment, a processor on a chip includes a plurality of processor cores; a level-two cache including a plurality of banks and a configure bank as FIFO register; and a crossbar switch connected to the plurality of processor cores and to the plurality of banks of the level-two cache. The crossbar switch includes a debug configure register.

A system includes this processor coupled to a memory. In one embodiment, this system is a stand-alone computer system and in another embodiment, is a client-server system.

In still another embodiment, a structure includes means for using at least a first bank of a level-two cache as a cache for data. The level-two cache includes a plurality of banks. The structure also includes means for using at least a second bank of the plurality of banks of the level-two cache as a first-in-first-out memory structure for storing commands associated with the data cached in the first bank.

The structure further includes means for configuring the level-two cache for the using at least the first bank as a cache and for the using at least the second bank as a FIFO. The means for configuring includes means for writing to a configure bank as FIFO register.

The structure also includes means for configuring a switch, coupling and decoupling a plurality of processor cores to the level-two cache, to pass new data to the first bank and to pass the commands to the second bank. The means for configuring the switch includes means for writing to a debug configure register.

BRIEF DESCRIPTION OF THE DRAWINGS

In the drawings and the detailed description, elements with the same reference numeral are the same or equivalent elements. Also, the first digit of the reference numeral is the figure number in which the corresponding element first appears.

DETAILED DESCRIPTION

Figure 2:
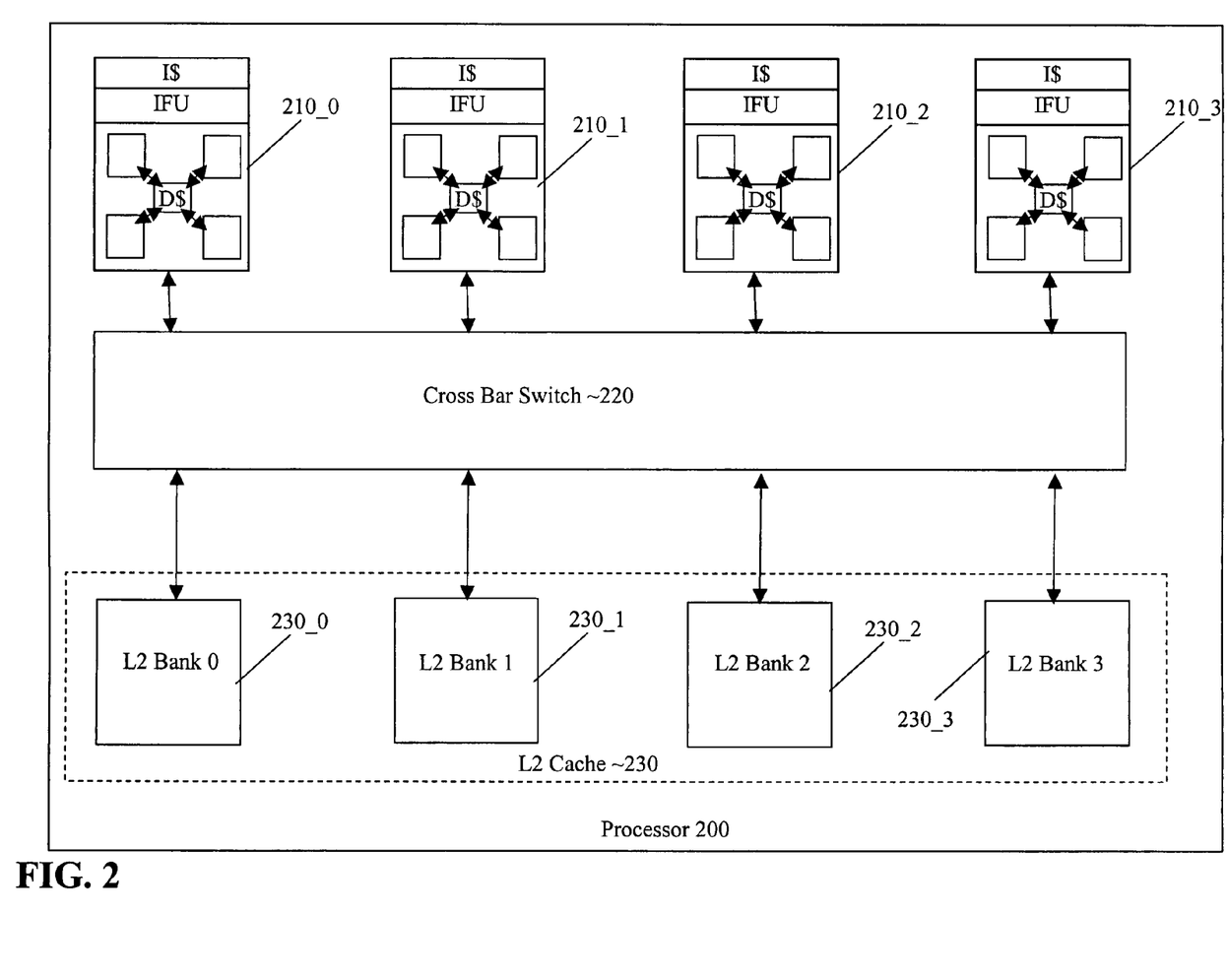
FIG. 2 is a high level diagram of a processor that includes a plurality of processor cores, a crossbar switch and a level-two cache that includes a plurality of banks on a chip and that supports lockstep operation with logging in the level-two cache according to one embodiment of the present invention.

In one embodiment of this invention, a novel method is used for assuring that a plurality of processors, e.g., processors cores $210\_0$, $210\_1$, is operating in lockstep and for rolling execution back to a predefined state when a store of information to a second level cache, e.g., bank zero $230\_0$ of L2 cache $230$ and bank one $230\_1$ of L2 cache $230$, indicates that plurality of processors $210\_0$, $210\_1$ is not operating in lockstep. In this embodiment, data is stored in a level-two cache $230$ that is on the same chip as processor cores $210\_0$, $210\_1$, $210\_2$, $210\_3$. Each of processors cores $210\_0$, $210\_1$, $210\_2$, $210\_3$ includes a plurality of microprocessors.

In one embodiment, L2 cache $230$ includes a plurality of banks $230\_0$, $230\_1$, $230\_2$, $230\_3$. In a lock-step mode of operation, two of the banks, e.g., banks $230\_0$, $230\_1$, are used as a cache, and two of the banks, e.g., banks $230\_2$, $230\_3$, are used as first-in-first-out memory structures (FIFOs).

In the lockstep mode of operation, data is stored in banks $230\_0$, $230\_1$ of L2 cache $230$ by a first processor core $210\_0$ and a second processor core $210\_1$ that are operating in lockstep. When new data is stored in L2 cache $230$, for example, to bank $230\_0$, the address and old data at the location of the store are passed through crossbar switch 220 to bank 230_2, which functions as a FIFO, and stores the address and old data.

As each pair of stores reaches crossbar switch 220, a compare is performed by crossbar switch 220. Note that since crossbar switch 220 and processor cores 210_0 and 210_1 are on the same chip, the problems associated with differences in external and internal clocks has been eliminated because only internal clocks are used on the chip. If the stores in the pair are the same, the data is processed as described above. If the stores are different, either an error or a glitch has occurred.

If the problem was a glitch, restarting execution from a known point allows processing to continue. Thus, the data in the banks functioning as FIFOs is used in rolling the state of processor 220 back to a known point, and then execution is resumed. This is all done without the application being executed knowing that the glitch occurred. Thus, using L2 cache 230 to store both new data and old data provides a new level of capability for high reliability computing.

Thus, in this example, this method is used with a processor 200 that includes a plurality of processor cores 210_0, 210_1, 210_2, 210_3, an on-chip level-two (L2) cache 230 that includes a plurality of banks 230_0, 230_1, 230_2, 230_3, and a crossbar switch 220 that couples and decouples each of the plurality of processor cores 210_0, 210_1, 210_2, 210_3 to L2 cache 230. Processor 200 includes other components and units, but there structures are not needed to understand the various embodiments of this invention. Accordingly, these structures are not described to avoid detracting from the description of the various embodiments.

Figure 3:
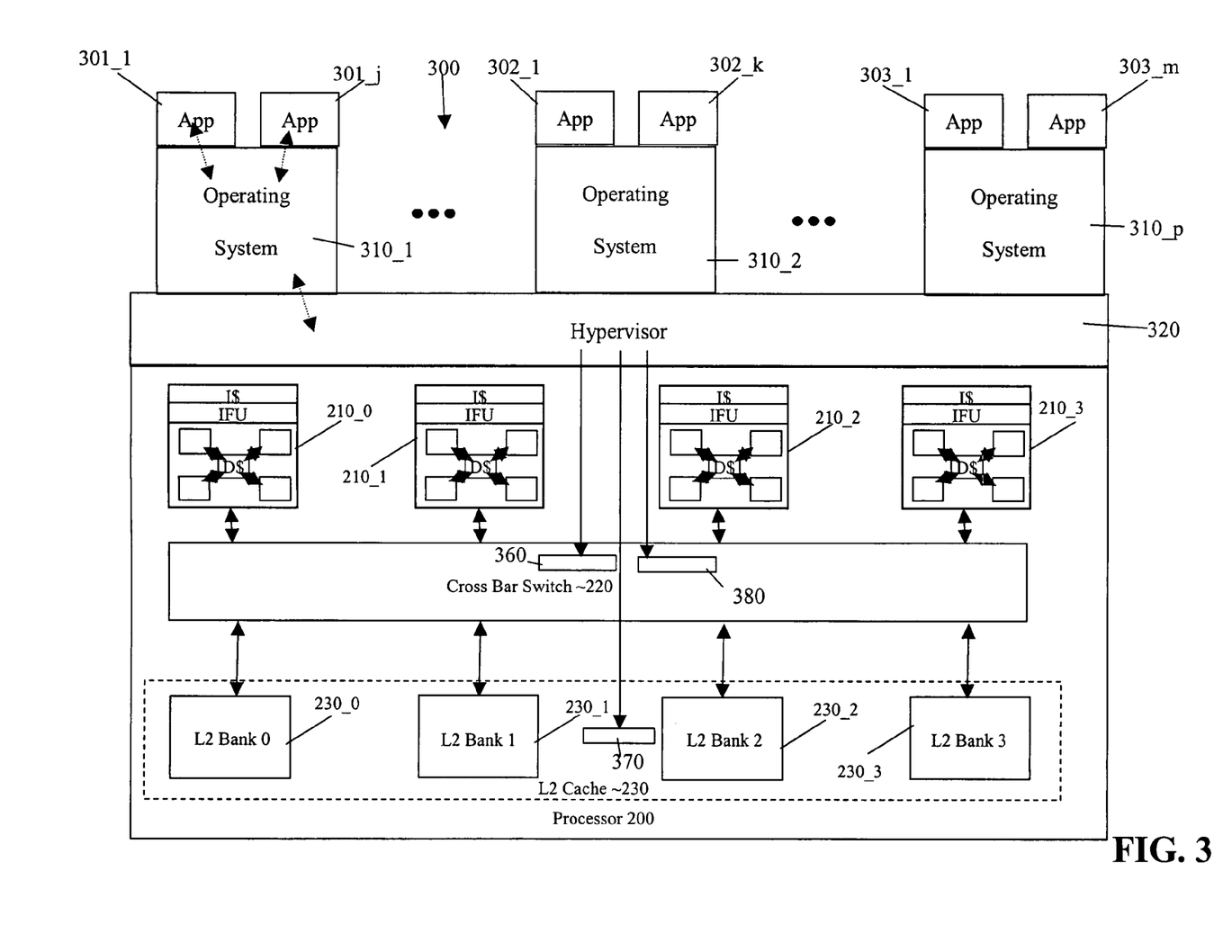
FIG. 3 is diagram of a system that includes a plurality of applications, a plurality of operating systems, a hypervisor, the processor of FIG. 2, that supports lockstep operation with logging in the level-two cache according to one embodiment of the present invention.

In this example, processor 200 (FIG. 2) is part of a processing system 300 (FIG. 3). Processing system 300 includes a plurality of applications 301_1 to 301_j, 302_1 to 302_k, and 303_1 to 303_m, a plurality of operating systems 310_1, 310_2, 310_p, a hypervisor 320, and processor 200. Plurality of operating systems 310_1, 310_2, 310_p, may be multiple copies of a single operating system (OS) or multiple heterogeneous operating systems.

Hypervisor 320, typically implemented as firmware, a combination of firmware and software, or all software, performs a number of functions and services for plurality of operating systems 310_1, 310_2, 310_p to create and enforce logical partitions for each virtual processor. Hypervisor 320 owns all system resources and provides an abstraction layer through which device access and control are arbitrated. Hypervisor 320 and firmware handle the mapping of memory, processors, and adapters for each logical partition. Plurality of applications 301_1 to 301_j, 302_1 to 302_k, and 303_1 to 303_m is generally unaware of where the partition's memory is located, which processor core has been assigned, or which adapters are in use.

In one embodiment, L2 cache 230 is two megabytes in total size and each of banks 230_0, 230_1, 230_2, 230_3 is 512 kilobytes in size. L2 cache 230 is eight-way set associative and has a 64-byte line size.

In this embodiment, L2 cache 230 is ECC protected. Each 64-byte line 410 (FIG. 4A) of L2 cache 230 is divided into two 32-byte blocks 411, 412 and a 10-bit ECC is generated for each block 420.

Figure 4A:
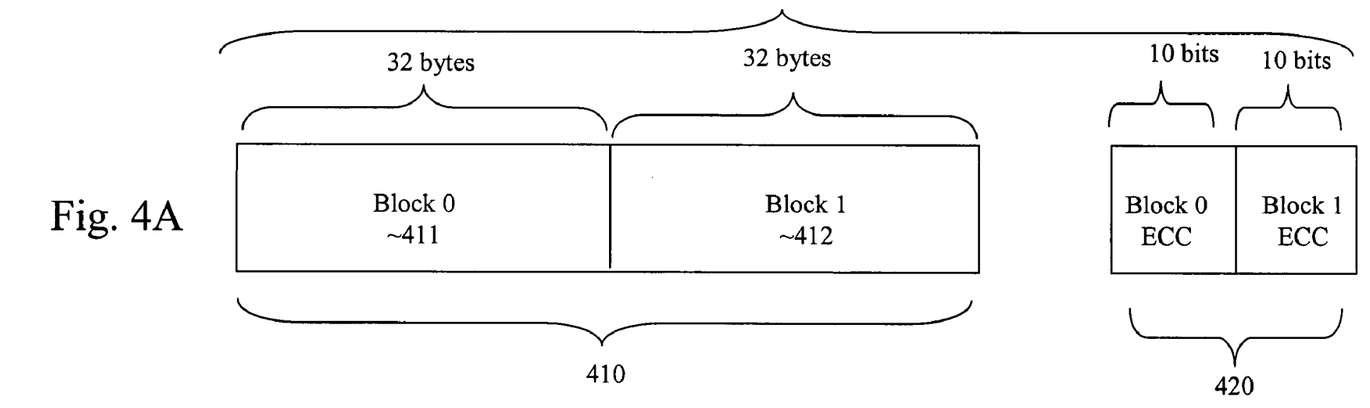
FIGS. 4A to 4C are illustrations of updating ECC when new data is cached in a bank of the level-two cache according to one embodiment of the present invention.
Figure 4B:
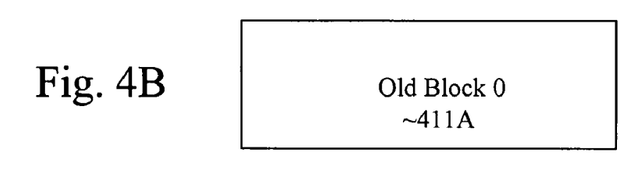
Figure 4C:
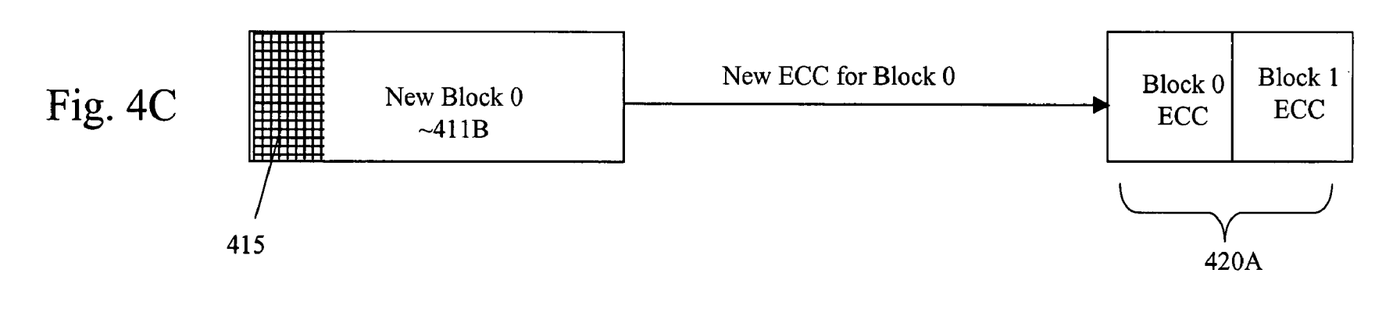

When new data is written to line 410, the data is 64 bits or less, e.g., 8 bytes, in size. Assuming that the data is for block zero 411, old block zero 411A (FIG. 4B) is read from L2 cache 230. New data 415 (FIG. 4C) is merged in old block zero 411A and a new ECC in ECC 420A is generated for block 411B. Thus, for each store to L2 cache 230, the old data is read. As explained more completely below, the old data and address are passed through switch 220 to another bank of L2 cache 230 in the lockstep rollback mode of operation.

Each bank of L2 cache 230 has 1024 lines, in this example. Line 0 is in bank 230_0. Line 1 is in bank 230_1. Line 2 is in bank 230_2 and line 3 is in bank 230_3. Line 4 is in bank 230_0 and so forth. L2 cache 230 is the first shared cache for plurality of processor cores 210_0, 210_1, 210_2, 210_3, and is responsible for memory ordering, coherency of level-one (L1) caches, atomics, and participates in transactional memory.

Figure 5:
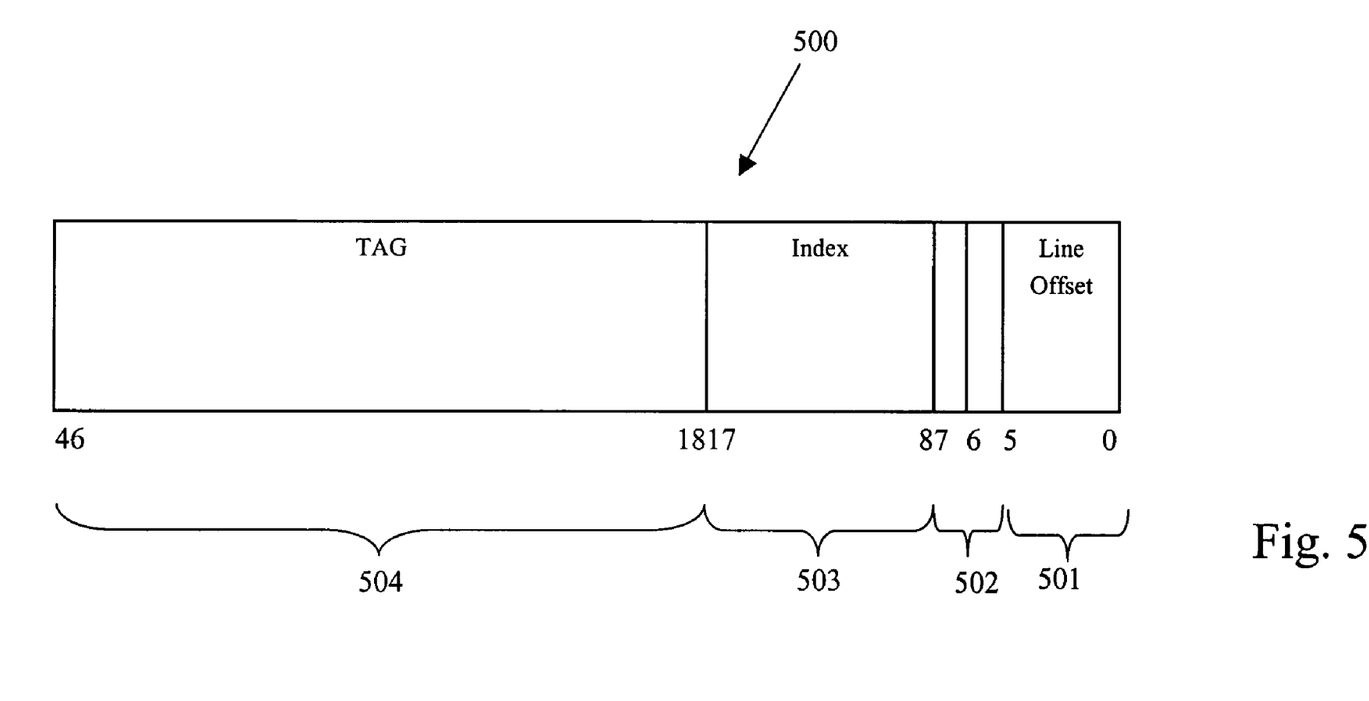
FIG. 5 is an illustration of an address for the level-two cache of FIGS. 2 and 3 according to one embodiment of the present invention.

An example of an address for L2 cache 230 is presented in FIG. 5. Address 500 has 47 bits. The six bits 0–5 are line offset bits 501 for L2 cache 230. The two bits 6, 7 are bank select bits 502. The ten bits 8 to 17 are index bits 503, and 29 bits 18 to 46 are tag bits 504.

However, as explained more completely below, the tag in L2 cache 230 is thirty bits in size rather than 29 bits, i.e., one additional tag bit is needed to implement the rollback process of this invention. For example, the tag stored in L2 cache 230 is bits 18 to 46 and bit 7, at least when L2 cache 230 has at least one bank configured to operate as a FIFO memory.

Each core in plurality of processor cores 210_0, 210_1, 210_2, 210_3 in processor 200 includes an instruction data cache that in one embodiment has a size of 64 Kbytes, an instruction fetch unit that is shared, four microprocessors, and a data cache, sometime called the level one cache, which is used by all four microprocessors. In this embodiment, each microprocessor has a four-issue capability, has two-way simultaneous multi-threading (SMT) capability, and has shadow registers for the architecture registers.

In one embodiment, each data cache is 32 Kbytes in size, four-way set associative, and write through (with no write allocate.) When data is written to one of the level-one data caches, e.g., a store, the data is passed through crossbar switch 220 to L2 cache 230 and written in one of the banks of L2 cache 230.

Crossbar switch 220 allows any microprocessor to use any bank of L2 cache 230 because crossbar switch is a full crossbar switch in this example.

In one embodiment, to enter the lockstep rollback mode of operation, hypervisor 320 initiates enable lockstep rollback operation 610 in a method 600 (FIG. 6) that configures crossbar switch 220 and L2 cache 230 for the lockstep rollback mode of operation. In this embodiment of enable lockstep rollback operation 610, hypervisor 320 writes to a crossbar switch lockstep rollback configure register 360, e.g., a first register, in configure switch operation 601 of operation 610.

Writing to crossbar switch lockstep rollback register 360 configures crossbar switch 220 to direct commands to banks 230_0 an 230_1 for execution, and for each store, to route the address of the store and the old data from banks 230_0 and 230_1 to banks 230_2 and 230_3. Switch 220 is configured so that, for example, for store commands directed to bank 230_0 for execution, the address and old data are routed to bank 230_2 and for store commands directed to bank 230_1 for execution, the address and old data are routed to bank 230_3.

Figure 6:
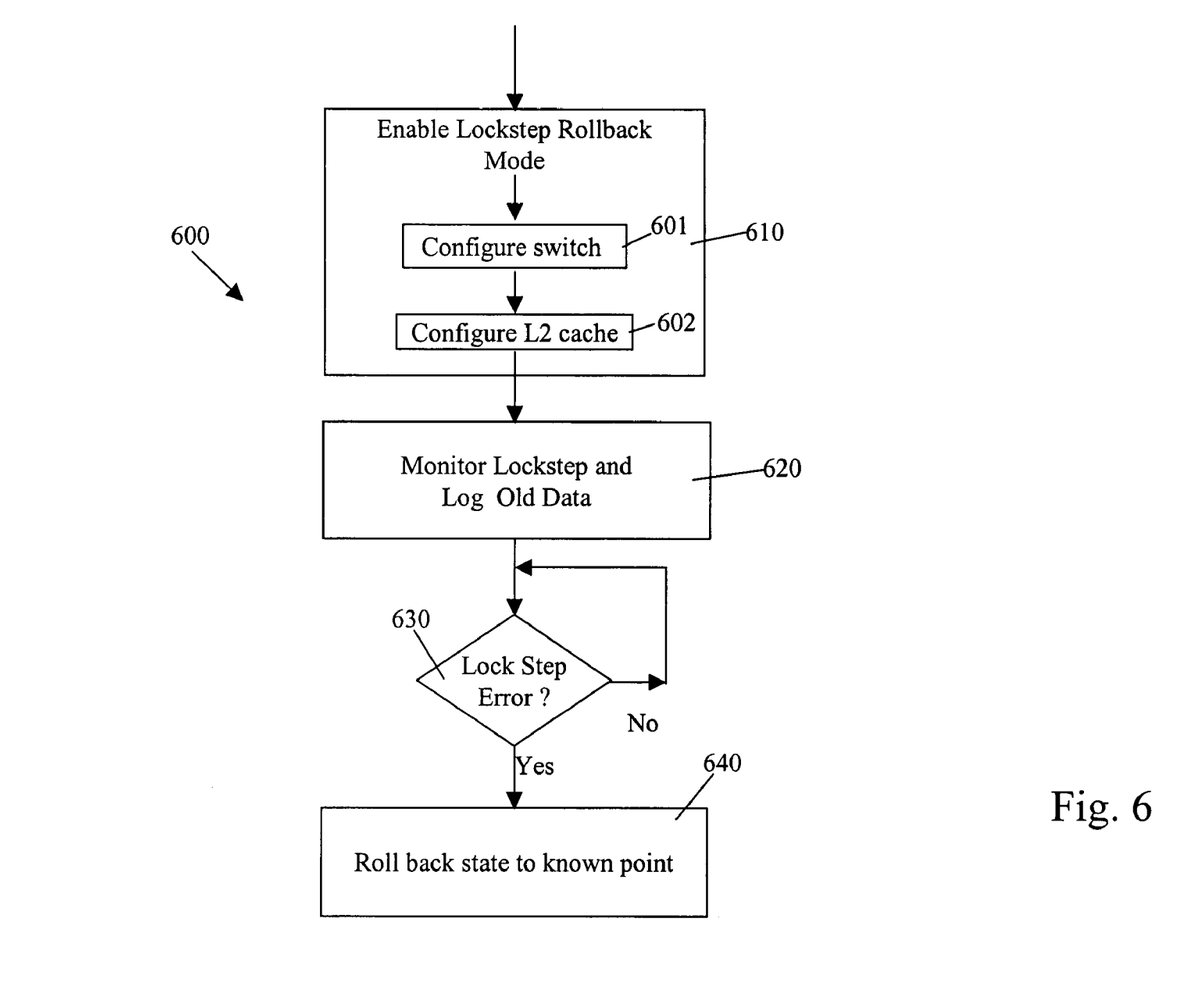
FIG. 6 is a process flow diagram for one embodiment of method of logging of level-two cache transactions into banks of the level-two cache and of using the logged data in a system rollback according to one embodiment of the present invention.

After completing operation 601, hypervisor 320 writes to a L2 cache configure bank as FIFO register 370 in configure L2 cache operation 602. Writing to L2 cache configure bank as FIFO register 370 configures L2 cache so that banks 230_0 and 230_1 function in the normal manner. However, banks 230_2 and 230_3 are configured not to function as a cache and instead are configured to function as a first-in-first-out memory structures, e.g., FIFOs.

Thus, information passed to banks 230_2 and 230_3 is not processed as commands, but instead is taken and stored in the next available storage location in the FIFO after hypervisor 320 writes to register 370. In one embodiment, each FIFO has a high water pointer to indicate when a certain percentage of the storage space in the FIFO is used.

In normal operation, the 29-bit tag is sufficient to uniquely locate each data item in a bank of L2 cache 230, because the index, bank, and line offset are implicit in the particular storage location. However, in the lockstep rollback mode, only one bank select bit is used and so two of the banks become invisible. The microprocessors function as if all four banks of L2 cache 230 are available, because the microprocessors do not know about the lockstep rollback mode of operation for the caches.

In lockstep mode, to determine whether a command was directed at the two invisible banks, an additional tag bit is stored in the two banks of L2 cache 230 that function as a cache. Thus, in this mode, the cache tag is address tag 404 plus one bank select bit, e.g., bit 7 (FIG. 4). Specifically, in the lockstep mode, the cache tag is the combination of address tag 404 and at least one bank select bit, e.g., an extra bit of tag is used.

Following completion of enable lockstep rollback mode operation 610, monitor lockstep and log old data operation 620 is performed. For each store to banks 230_0 and 230_1, crossbar switch 220 compares the data. If the data is the same, a new ECC is generated, the old data and address are transferred to the appropriate bank of L2 cache operating as a FIFO and processing continues.

If an error is detected by crossbar switch 220, lockstep error check operation 630 transfers processing to roll back state to known point operation 640. In operation 640, data in the FIFOs is used in rolling back the state of L2 cache 230 to a known point and so that execution can be restarted at the known point.

To implement one embodiment of method 600 a checkpoint instruction is utilized. In this embodiment, the syntax of the checkpoint instruction is:

checkpoint, <label> where execution of instruction checkpoint causes a processor (i) to take a snapshot of the state of this thread by the processor, e.g., the architectural registers are copied to the shadow register and (ii) causes the L2 cache to flush the banks functioning as FIFOs. Label <label> is a location that processing transfers to if the checkpointing fails, either implicitly or explicitly.

After a processor takes a snapshot of the state, I/O data is buffered also. This is necessary because if the state is rolled back to the snapshot state, I/O devices must also be configured properly for that state.

The processor also monitors whether another thread performs an operation that would prevent a rollback of the state, e.g., writes to a location in the checkpointed state, or stores a value in a location in the checkpointed state. If such an operation is detected, the work done following the snapshot is flushed, the snapshot state is restored, and processing branches to label <label>. This is an implicit failure during the lockstep operation.

An explicit failure of the checkpointing is caused by execution of a statement Fail. The execution of statement Fail causes the processor to restore the state to the snapshot state, and to branch to label <label>. In this embodiment, statement Fail is executed upon a mis-compare for a store to L2 cache 230 being detected, for example.

This description of a checkpoint instruction is illustrative only and is not intended to limit the invention to this specific embodiment. In view of this disclosure, the features of this invention can be implemented in a wide variety of ways. Also, when it is stated that a processor takes an action, those of skill in the art understand that the action is the result of executing one or more instructions of an application, an operating system, or the hypervisor, for example, or responding to automated hardware.

Thus, in this embodiment, after performing operations 601 and 602, a checkpoint instruction is executed so that the architectural state of processor cores operating in lockstep are copied to the shadow registers. The banks of L2 cache 230 that are configured to function as FIFOs are flushed, and the operating system buffers the I/O for I/O devices.

Assuming that there are no implicit errors and no mis-compares for store commands to L2 cache 230, when a FIFO of L2 cache 230 hits a high water mark, the buffered I/O is committed, and then a new checkpoint instruction is executed. Thus, a new snapshot of the architectural state is taken by coping the values of the architectural registers to the shadow registers and the banks of L2 cache 230 that are configured to function as FIFOs are flushed, and the operating system again buffers the I/O for I/O devices. This prevents overwriting of data in the FIFOs, which would also make it impossible to rollback the banks of the L2 cache to the snapshot state.

When a mis-compare is detected in a store command for L2 cache 230, the instruction FAIL associated with the checkpoint instruction is executed. This causes the values in the shadow registers to be copied back into the architectural registers, the data in the FIFOs is used to restore the L2 cache to the state at the time the checkpoint instruction was executed, i.e., the snapshot state, by rolling the stored cache data back into the appropriate bank of L2 cache 230, and the buffered I/O is flushed. Thus, the state of the lock-step system is restored to a prior known point in the execution. If an implicit checkpoint error is detected, a similar rollback is performed, or alternatively, system processing can be stopped.

Figure 7:
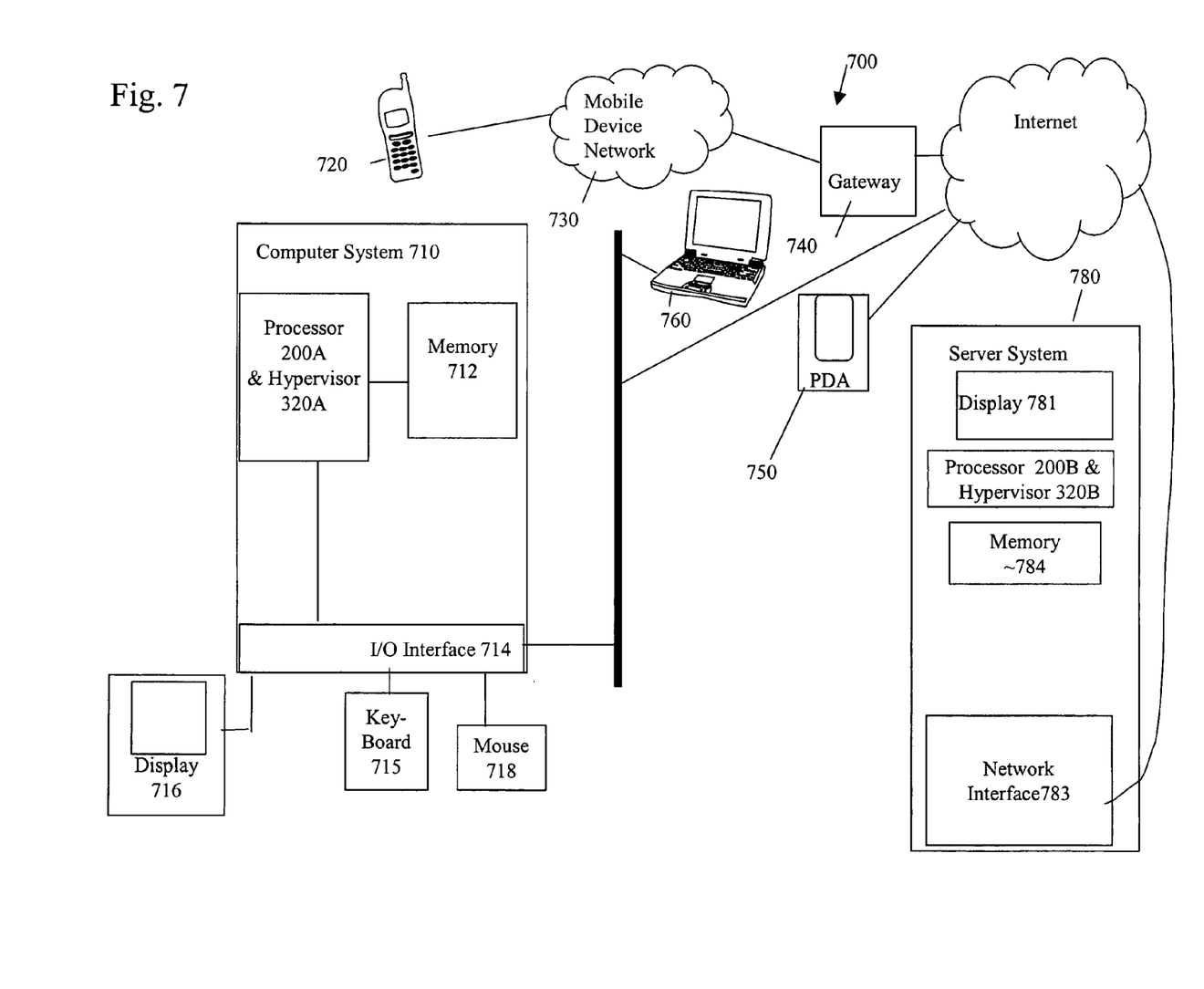
FIG. 7 is a diagram of a system and of systems that utilize the method of logging of level-two cache transactions into banks of the level-two cache and for using the logged data in a system rollback according to various embodiments of the present invention.

In one embodiment, processor 200A with hypervisor 320A is included in a hardware configuration 710 like a personal computer or workstation so that configuration 710 includes rollback method 600. In this embodiment, the applications and operating system(s) are included in memory 712 or a memory coupled to processor 200A via the Internet for example. Hardware configuration 710 includes, but is not limited to, an I/O interface 714, a display 716, a keyboard 714, and a mouse 718.

However, in another embodiment, system 710 is part of a client-server computer system 700. In this embodiment, server system 780 includes a processor 200B with hypervisor 320B as well as a display 781, memory 784, and a network interface 783. Thus, system 780 includes rollback method 600. In one embodiment, system 780 essentially is processor 200B with hypervisor 320B.

For either a client-server computer system 700 or a stand-alone computer system 710, memory 712 typically includes both volatile memory, such as main memory, and non-volatile memory, such as hard disk drives. While memory 712 is illustrated as a unified structure in FIG. 7, this should not be interpreted as requiring that all memory in memory 712 is at the same physical location. All or part of memory 712 can be in a different physical location than processor 200A.

More specifically, processor 200 and hypervisor 320, in one embodiment, can be included in a portable computer 760, a workstation 710, a server computer 780, or any other device 720, 740, 750. Similarly, in another embodiment, system 700 can be comprised of multiple different computers, wireless devices, server computers, or any desired combination of these devices that are interconnected to perform the operations, as described herein.

Herein, a computer program product comprises a medium configured to store or transport computer readable code or in which computer readable code for a method is stored. Some examples of computer program products are CD-ROM discs, ROM cards, floppy discs, magnetic tapes, computer hard drives, servers on a network and signals transmitted over a network representing computer readable program code.

Herein, a computer memory refers to a volatile memory, a non-volatile memory, or a combination of the two. Similarly, a computer input unit 716 and a display unit 715 refer to the features providing the required functionality to input the information described herein, and to display the information described herein, respectively, in any one of the aforementioned or equivalent devices.

In view of this disclosure, the rollback functionality can be implemented in a wide variety of computer system configurations that include a chip having both processors and a L2 cache using an operating system and computer programming language of interest to the user.

While the level-two cache logging method for system rollback has been explained in connection with one embodiment thereof, those skilled in the art readily recognize that modifications can be made to this embodiment without departing from the spirit and scope of the present invention.

Figure 8:
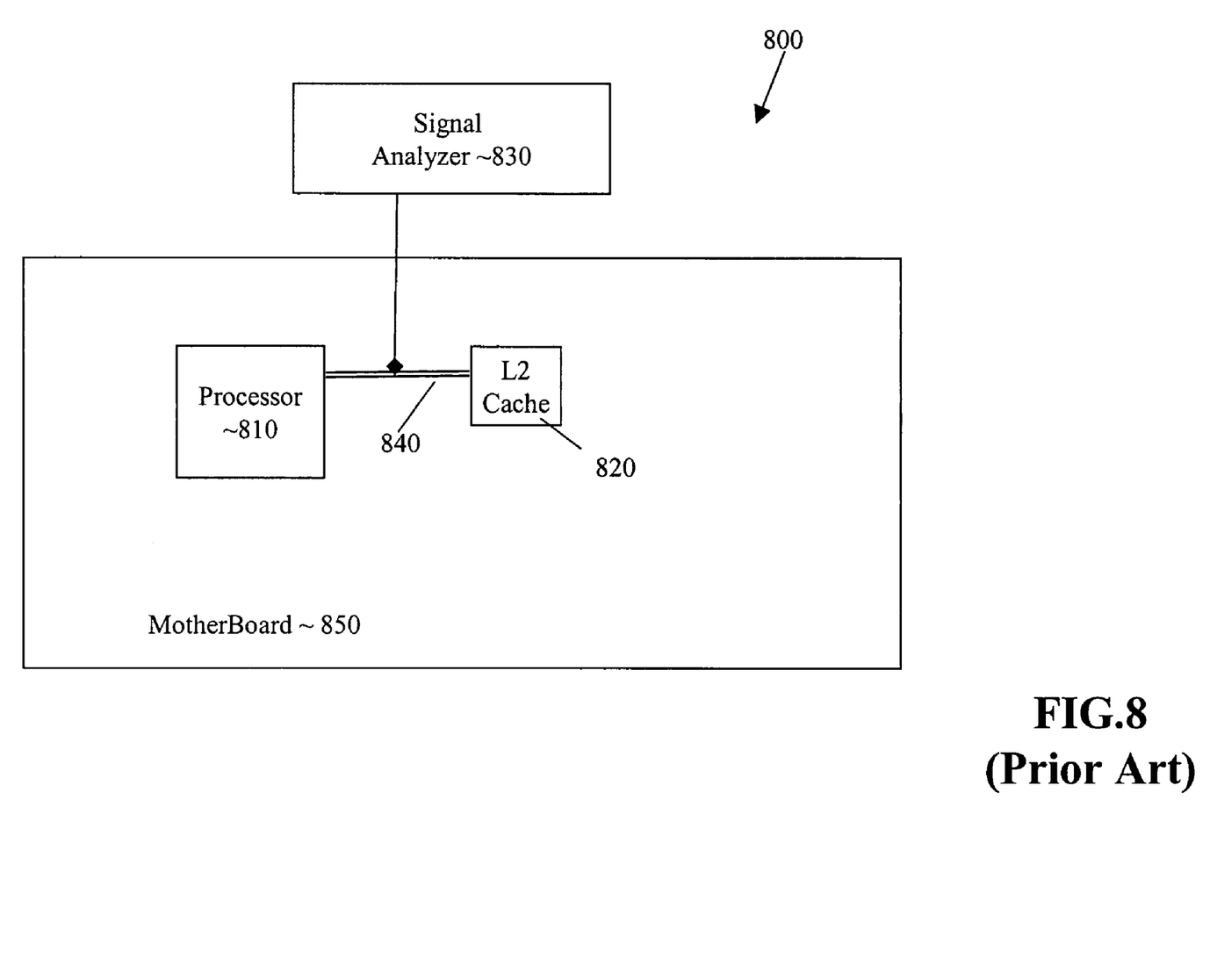
FIG. 8 is a block diagram of a prior art system that included a signal analyzer used in debugging a level-two cache.

In a prior art system 800, typically a processor 810 was one chip on a motherboard 850 and a level-two (L2) cache 820 was another chip on motherboard 850. To debug memory ordering or coherency problems, a signal analyzer 830 was connected to a bus 840 that connected processor 810 to level-two cache 820. Signal analyzer 830 was used to obtain data for analyzing the coherency and ordering, for example, of information in L2 cache 820.

The techniques for analyzing the information on bus 840 are well known. Unfortunately, as systems have become more integrated, debugging the system has become more complex. For example, if L2 cache 820 is moved unto the same chip as processor 810, bus 840 is internal to the chip. Consequently, signal analyzer 830 is not useful because it is difficult to find a specific wire or wires in the bus, and it is not practical even if the wires can be located to attach the prior art signal analyzer to the wires. Also, the clock speed of the bus makes use of signal analyzer 830 impractical.

It is also well known that as integration advances, there are not enough pins available to route every internal function to one or more pins. Thus, new techniques are needed for verifying the ordering and coherency of information stored in an L2 cache when the L2 cache in included in the same chip as the processor.

In another embodiment of this invention, a novel method is used for diagnosis and debugging of problems associated with information stored in level-two (L2) cache 230. In a debugging mode of operation, data is cached in at least one bank of L2 cache 230 and the commands directed to L2 cache 230 are stored in another bank of L2 cache 230 along with information concerning the status of the data in the level-one (L1) cache.

In this embodiment, the bank of L2 cache storing the command sequence is operated as a first-in-first-out memory. In one embodiment, the number of commands stored in the L2 cache for playback is at least equivalent to the number of commands available in the prior art L2 cache debugging methods.

Figure 9:
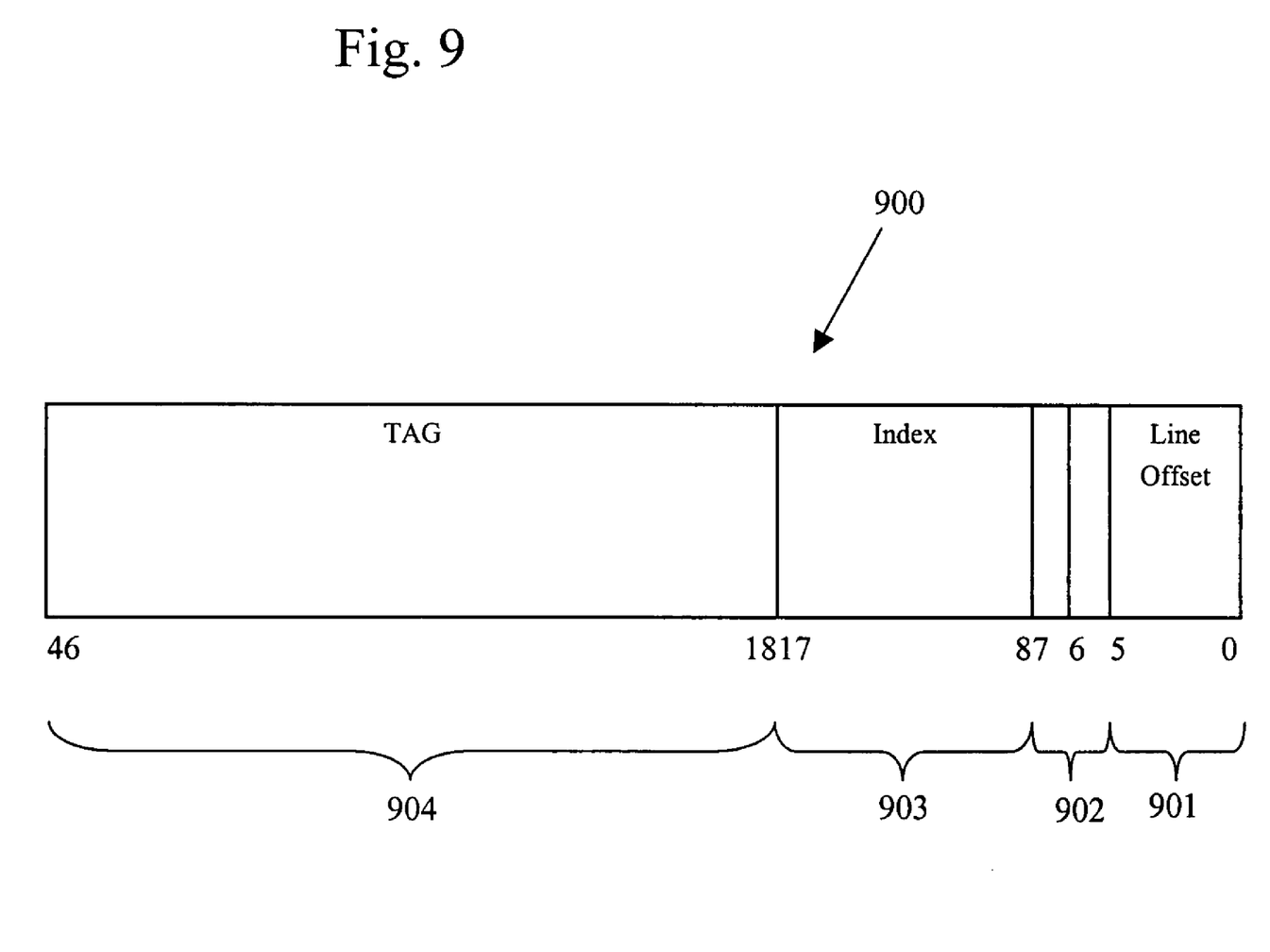
FIG. 9 is an illustration of an address for the level-two cache of FIGS. 2 and 3 according to one embodiment of the present invention.

An example of an address 900 for L2 cache 230 is presented in FIG. 9. Address 900 has 47 bits. The six bits 0–5 are line offset bits 901. The two bits 6, 7 are bank select bits 902. The ten bits 8 to 17 are index bits 903, and 29 bits 18 to 46 are tag bits 904.

However, as explained more completely below, the tag in L2 cache 230 is thirty bits in size rather than 29 bits, i.e., one additional tag bit is needed to implement the debugging process of this invention. For example, the tag stored in L2 cache 230 is bits 18 to 46 and bit 7, at least when L2 cache 230 has at least one bank configured to operate as a FIFO memory.

In one embodiment, each data cache is 32 Kbytes in size, four-way set associative, and write through (with no write allocate.) When data is written to one of the level-one data caches, e.g., a store, the data is passed through crossbar switch 220 to L2 cache 230 and written in one of the banks of L2 cache 230. A bit associated with the data is set to indicate the data is in the data cache. This extra bit is used in the debugging of the cache to determine whether for example, the bit is asserted to indicate that the data is in a level-one data cache, but yet a store for the data has been passed to L2 cache indicating that the level-one cache did not find the data.

Figure 10:
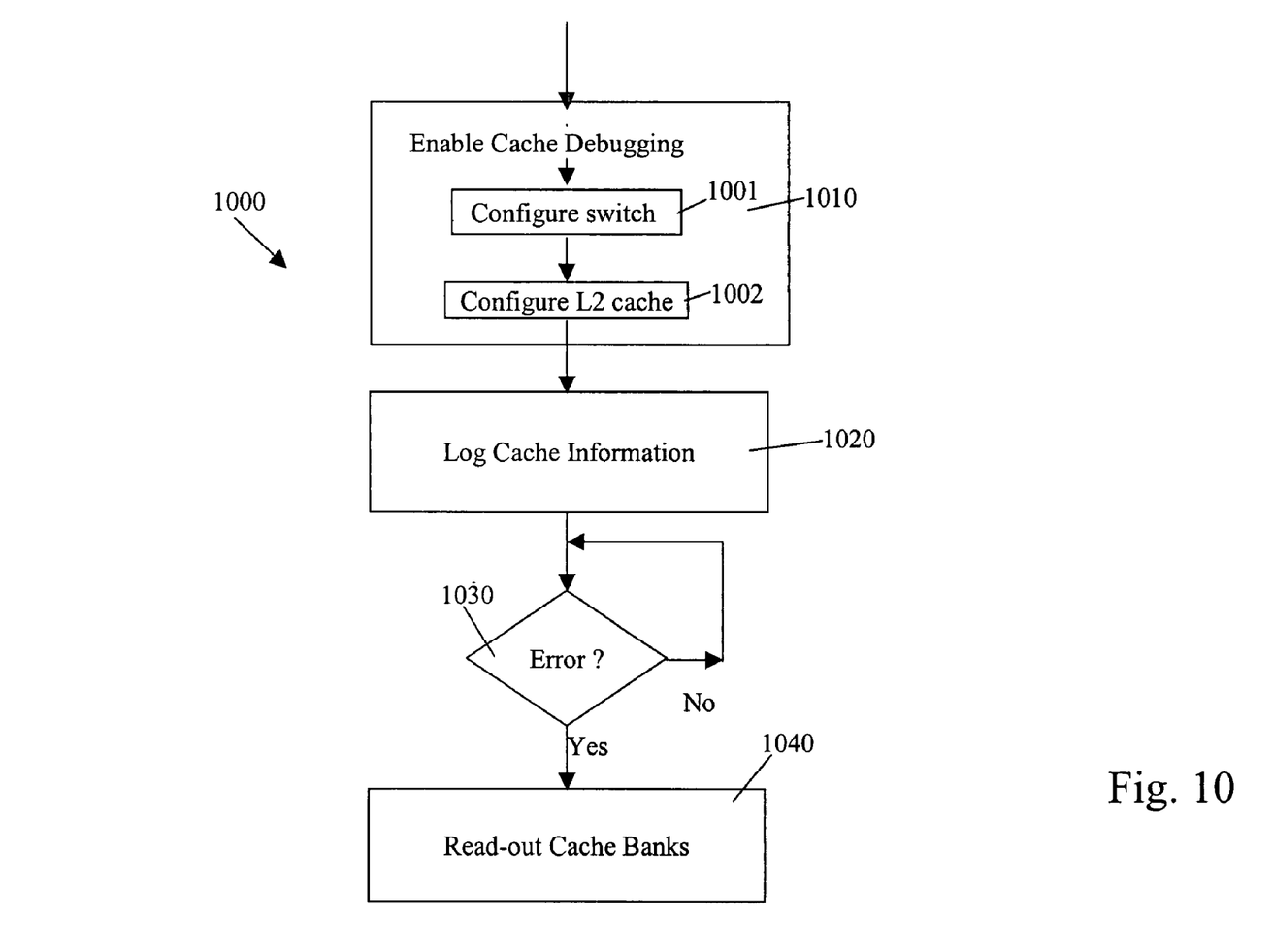
FIG. 10 is a process flow diagram for one embodiment of method of logging of level-two cache transactions into banks of the level-two cache and of using the logged transactions for diagnostic and debug operations according to one embodiment of the present invention.

In one embodiment, to enter the debugging mode of operation, hypervisor 320 initiates enable cache debugging operation 1010 that configures crossbar switch 220 and L2 cache 230 for the debugging mode of operation. In this embodiment of enable cache debugging operation 1010, hypervisor 320 writes to a crossbar switch debug configure register 380, e.g., a first register, in configure switch operation 1001 of operation 1010. Writing to crossbar switch debug configure register 380 configures crossbar switch 220 to direct commands to banks 230_0 an 230_1 for execution, and to broadcast the commands themselves to banks 230_2 and 230_3. Switch 220 is configured so that, for example, the commands directed to bank 230_0 for execution are broadcast to bank 230_2 and the commands directed to bank 230_1 for execution are broadcast to bank 230_3.

After completing operation 1001, hypervisor 320 writes to a L2 cache configure bank as FIFO register 370. Writing to L2 cache configure bank as FIFO register 370 configures L2 cache so that banks 230_0 and 230_1 function in the normal manner. However, banks 230_2 and 230_3 are configured not to function as a cache and instead are configured to function as first-in-first-out memory structures, e.g., FIFOs. Thus, information passed to banks 230_2 and 230_3 is not processed as commands, but instead is taken and stored in the next available storage location in the FIFO after hypervisor 320 writes to register 370. In one embodiment, each FIFO has a high water pointer to indicate when a certain percentage of the storage space in the FIFO is used.

In normal operation, the 29-bit tag is sufficient to uniquely locate each data item in a bank of L2 cache 230, because the index, bank, and line offset are implicit in the particular storage location. However, in the cache debug mode, only one bank select bit is used and so two of the banks become invisible. The microprocessors function as if all four banks of L2 cache 230 are available, because the microprocessors do not know about the debug mode of operation for the caches.

In debugging, to determine whether a command was directed at the two invisible banks, an additional tag bit is stored in the two banks that function as a cache. Thus, in this mode, the cache tag is address tag 904 plus one bank select bit, e.g., bit 7 (FIG. 9). Specifically, in the debug mode, the cache tag is the combination of address tag and at least one bank select bit, e.g., an extra bit of tag is used.

Following completion of enable cache debugging operation 1010, logging cache information 1020 caches the data in banks 230_0 and 230_1 and logs the commands associated with the data in banks 230_2 and 230_3, respectively. In addition, the data in banks 230_2 and 230_3 includes the hit/miss status in a L1 cache for each data entry.

In this embodiment, each command is 16 bytes and so each 512 Kbyte bank holds 32 K commands. After, 32 K commands, the FIFO starts overwriting the stored commands.

Thus, system 300 continues in the debug mode until an error occurs, and then error check operation 1030 transfers to read-out cache banks operations 1040. In operation, both the data in the cache and up to 64 K (32 K from each bank) commands can be read out of L2 cache 230. The information includes the status of data in the L1 caches. Accordingly, it is possible to determine both the state of the L1 cache and the L2 cache at the time of the error. This is an advance over the prior art systems that were not able to obtain data about the L1 cache.

Figure 11:
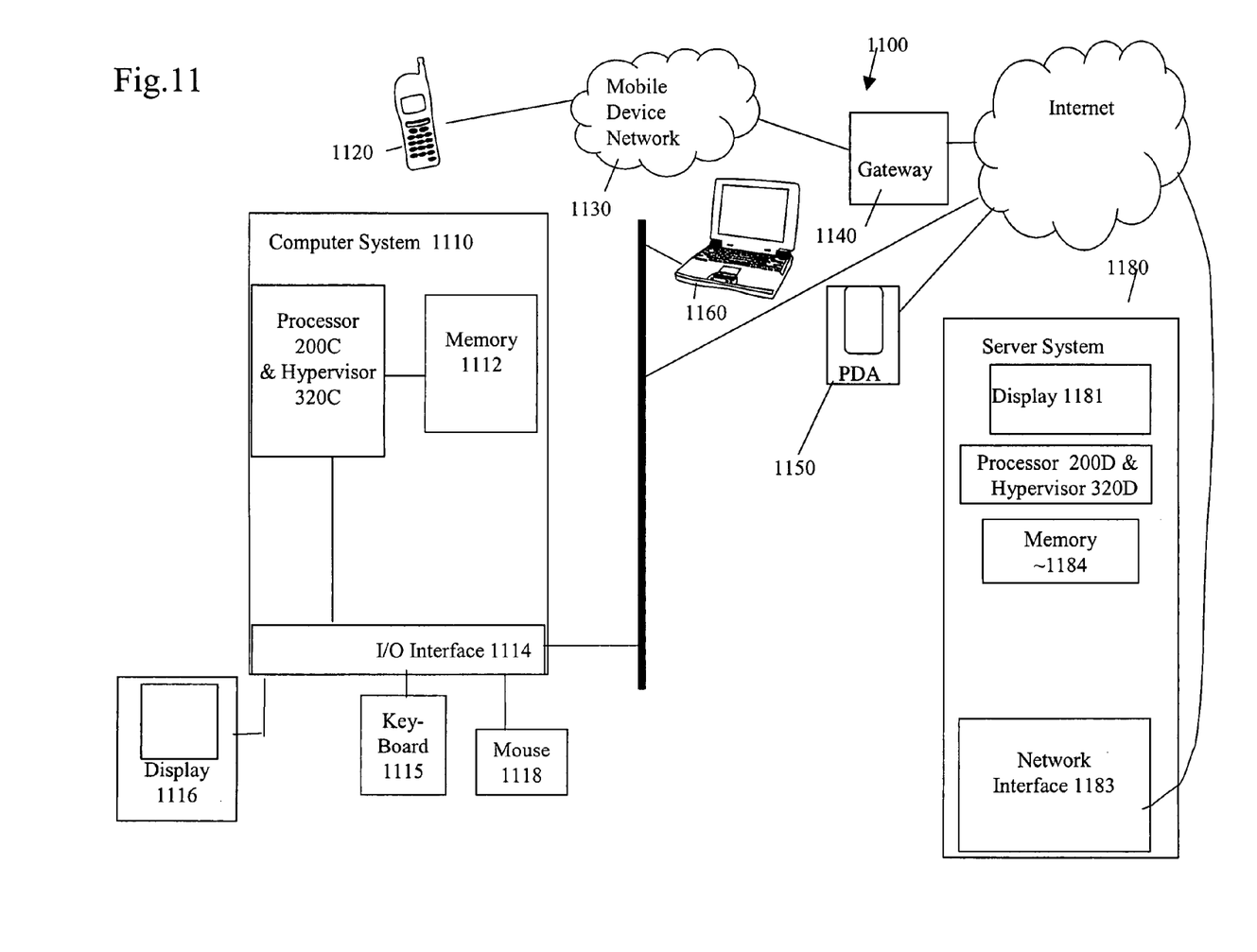
FIG. 11 is a diagram of a system and of systems that utilize the method of logging of level-two cache transactions into banks of the level-two cache and of using the logged transactions for diagnostic and debug operations, according to various embodiments of the present invention.

In one embodiment, processor 200C with hypervisor 320C is included in a hardware configuration 1110 like a personal computer or workstation so that configuration 1110 includes debug method 1000. In this embodiment, the applications and operating system(s) are included in memory 1112 or a memory coupled to processor 200C via the Internet for example. Hardware configuration 1110 includes, but is not limited to, an I/O interface 1114, a display 1116, a keyboard 1114, and a mouse 1118.

However, in another embodiment, system 1110 is part of a client-server computer system 1100. In this embodiment, server system 1180 includes a processor 200D with hypervisor 320D as well as a display 1181, memory 1184, and a network interface 1183. Thus, system 1180 includes debug method 1000. In one embodiment, system 1180 essentially is processor 200D with hypervisor 320D.

For either a client-server computer system 1100 or a stand-alone computer system 1110, memory 1112 typically includes both volatile memory, such as main memory, and non-volatile memory, such as hard disk drives. While memory 1112 is illustrated as a unified structure in FIG. 11, this should not be interpreted as requiring that all memory in memory 1112 is at the same physical location. All or part of memory 1112 can be in a different physical location than processor 200A.

More specifically, processor 200 and hypervisor 320, in one embodiment, can be included in a portable computer 1160, a workstation 1110, a server computer 1180, or any other device 1120, 1140, 1150. Similarly, in another embodiment, system 1100 can be comprised of multiple different computers, wireless devices, server computers, or any desired combination of these devices that are interconnected to perform the operations, as described herein.

Herein, a computer memory refers to a volatile memory, a non-volatile memory, or a combination of the two. Similarly, a computer input unit 1116 and a display unit 1115 refer to the features providing the required functionality to input the information described herein, and to display the information described herein, respectively, in any one of the aforementioned or equivalent devices.

In view of this disclosure, the cache debug functionality can be implemented in a wide variety of computer system configurations that include a chip having both processors and a L2 cache using an operating system and computer programming language of interest to the user.

While the cache debug method hereinbefore has been explained in connection with one embodiment thereof, those skilled in the art will readily recognize that modifications can be made to this embodiment without departing from the spirit and scope of the present invention.

We claim:

1. A method comprising:
  using at least a first bank of a level-two cache as a cache for data wherein the level-two cache includes a plurality of banks; and
  using at least a second bank of the plurality of banks of the level-two cache as a first-in-first-out memory structure for storing old data from the first bank.

2. The method of claim 1 further comprising:
  configuring the level-two cache for the using at least the first bank and for the using at least the second bank.

3. The method of claim 2 wherein the configuring comprises:
  writing to a configure bank as FIFO register.

4. The method of claim 1 further comprising:
  configuring a switch, coupling and decoupling a plurality of processor cores to the level-two cache, to pass new data to the first bank and to pass the old data to the second bank.

5. The method of claim 4 wherein the configuring the switch comprises:
  writing to a lockstep rollback configure register.

6. The method of claim 1 wherein an address for the level-two cache includes an address tag and a plurality of bank select bits, the using the first bank further comprising:
  storing the address tag and at least one bank select bit as a tag in the first bank of the level-two cache.

7. The method of claim 1 wherein the using at least the first bank of the level-two cache as a cache further comprises:
  storing new data at a location in the first bank of the level-two cache.

8. The method of claim 7 wherein the using at least the second bank in the plurality of banks of the level-two cache as the first-in-first-out memory structure further comprises:
  logging old data, from the location, in the second bank of the level-two cache.

9. A method comprising:
  caching new data at a location in a bank of a level-two cache; and
  logging old data, from the location, in another bank of the level-two cache.

10. The method of claim 9 further comprising:
  using the old data to rollback a state of the bank in the level-two cache to a prior known state.

11. A processor comprising:
  a plurality of processor cores;
  a level-two cache including:
    a plurality of banks; and
    a configure bank as FIFO register; and
  a crossbar switch connected to the plurality of processor cores and to the plurality of banks of the level-two cache comprising:
    a lockstep rollback configure register.

12. A system comprising:
  a processor comprising:
    a plurality of processor cores;

a level-two cache including:
   a plurality of banks; and
   a configure bank as FIFO register;
  a crossbar switch connected to the plurality of processor cores and to the plurality of banks of the level-two cache comprising:
   a lockstep rollback configure register; and
 a memory coupled to the processor.

13. The system of claim 12 wherein the system comprises a stand-alone computer system.

14. The system of claim 12 wherein the system comprises a client-server system.

15. A structure comprising:
  means for using at least a first bank of a level-two cache as a cache for data wherein the level-two cache includes a plurality of banks; and
  means for using at least a second bank of the plurality of banks of the level-two cache as a first-in-first-out memory structure for storing old data from the first bank.

16. The structure of claim 15 further comprising:
  means for configuring the level-two cache for the using at least the first bank and for the using at least the second bank.

17. The structure of claim 16 wherein the means for configuring comprises:
  means for writing to a configure bank as FIFO register.

18. The structure of claim 15 further comprising:
  means for configuring a switch, coupling and decoupling a plurality of processor cores to the level-two cache, to pass new data to the first bank and to pass the old data to the second bank.

19. The structure of claim 18 wherein the means for configuring the switch comprises:
  means for writing to a lockstep rollback configure register.

20. The structure of claim 15 wherein an address for the level-two cache includes an address tag and a plurality of bank select bits, the means for using the first bank further comprising:
  means for storing the address tag and at least one bank select bit as a tag in the first bank of the level-two cache.

21. The structure of claim 15 wherein the means for using at least the first bank of the level-two cache as a cache further comprises:
  means for storing new data at a location in the first bank of the level-two cache.

22. The structure of claim 21 wherein the means for using at least the second bank in the plurality of banks of the level-two cache as the first-in-first-out memory structure further comprises:
  means for logging old data, from the location, in the second bank of the level-two cache.

23. A structure comprising:
  means for storing new data at a location in a bank of a level-two cache; and
  means for logging old data, from the location, in another bank of the level-two cache.

24. The structure of claim 23 further comprising:
  means for using the old data to rollback a state of the bank in the level-two cache to a prior known state.

\* \* \* \* \*